US010706011B2

(12) United States Patent
Leinberg et al.

(10) Patent No.: US 10,706,011 B2
(45) Date of Patent: Jul. 7, 2020

(54) METHODS FOR FACILITATING PRESERVATION AND RETRIEVAL OF HETEROGENEOUS CONTENT AND DEVICES THEREOF

(71) Applicant: InfoPreserve Inc., Pittsford, NY (US)

(72) Inventors: Eric J. Leinberg, Webster, NY (US); Clive R. Daunton, Rochester, NY (US); Jacob A. Constantinides, Honeoye, NY (US)

(73) Assignee: INFOPRESERVE INC., Webster, NY (US)

( * ) Notice: Subject to any disclaimer, the term of this patent is extended or adjusted under 35 U.S.C. 154(b) by 267 days.

(21) Appl. No.: 13/888,076

(22) Filed: May 6, 2013

(65) Prior Publication Data
US 2013/0297614 A1 Nov. 7, 2013

Related U.S. Application Data

(60) Provisional application No. 61/642,927, filed on May 4, 2012.

(51) Int. Cl.
G06F 16/14 (2019.01)
(52) U.S. Cl.
CPC .................... *G06F 16/14* (2019.01)
(58) Field of Classification Search
CPC ....... G06F 16/48; G06F 16/907; G06F 16/164
See application file for complete search history.

(56) References Cited

U.S. PATENT DOCUMENTS

| | | | | |
|---|---|---|---|---|
| 7,577,689 | B1 * | 8/2009 | Masinter | G06F 21/62 |
| 7,765,245 | B2 * | 7/2010 | Nichols | G06F 17/30038 |
| | | | | 707/736 |
| 7,801,863 | B2 * | 9/2010 | Brown | G06Q 10/10 |
| | | | | 707/663 |
| 2005/0114357 | A1 * | 5/2005 | Chengalvarayan | G11B 27/034 |
| 2006/0059144 | A1 * | 3/2006 | Canright | G06F 17/30011 |
| 2008/0046343 | A1 * | 2/2008 | Maguire | G06Q 30/06 |
| | | | | 705/26.62 |

(Continued)

OTHER PUBLICATIONS

Cole, B., Search Engines Tacke the Desktop, IEEE Computer Society, Mar. 2005, pp. 14-17.*

(Continued)

*Primary Examiner* — Cheyne D Ly
(74) *Attorney, Agent, or Firm* — Pepper Hamilton LLP

(57) ABSTRACT

A method, non-transitory computer readable medium, and content management apparatus receives a storage request including content and context information associated with the received content, the context information comprising at least metadata and information for one or more user tags, wherein the user tags are customizable and established by an administrator. One of a plurality of types of content is identified for the received content. Searchable information is extracted from the received content based on the identified one of the plurality of types of content. A searchable index is generated for the received content based on at least the extracted searchable information and the context information associated with the received content. The received content is stored in a manner which is retrievable based on one or more associations in the generated searchable index.

15 Claims, 9 Drawing Sheets

(56) References Cited

U.S. PATENT DOCUMENTS

| | | | | |
|---|---|---|---|---|
| 2009/0043789 A1* | 2/2009 | Gupta | ............... | G06F 17/30029 |
| 2009/0089275 A1* | 4/2009 | Drory | ............... | G06F 17/30693 |
| 2009/0164915 A1* | 6/2009 | Gasn | ................ | G06F 17/30893 |
| | | | | 715/753 |
| 2010/0325102 A1* | 12/2010 | Maze | ............... | G06F 17/30011 |
| | | | | 707/722 |

OTHER PUBLICATIONS

Chirita et al., Activity Based Metadata for Semantic Desktop Search, ESWC 2005, LNCS 3532, pp. 439-454.*
Basso et al., "MarketScope for Enterprise File Synchronization and Sharing," Gartner, Inc. ID: G00226376, pp. 1-24 (Feb. 12, 2013).
Child et al., "Magic Quadrant for Enterprise Information Archiving," Gartner, Inc. ID: G00230024, pp. 1-16 (Dec. 13, 2012).
MacComascaigh et al., "Magic Quadrant for Web Content Management," Gartner, Inc. ID: G00233574, pp. 1-17 (Sep. 6, 2012).

* cited by examiner

METHODS FOR FACILITATING PRESERVATION AND RETRIEVAL OF HETEROGENEOUS CONTENT AND DEVICES THEREOF

This application claims the benefit of U.S. Provisional Patent Application Ser. No. 61/642,927, filed May 4, 2012, which is hereby incorporated by reference in its entirety.

FIELD

This technology generally relates to managing content and, more particularly, to methods, non-transitory computer readable, and apparatus for ingesting, securing, managing access of, and preserving heterogeneous types of unstructured content.

BACKGROUND

Securing, managing, and retrieving information in the form of unstructured content including digital documents, electronic mail, audio files, video files, and images or bitmap files, for example, is increasingly difficult for many organizations. Managing information, which is often a critical asset of an organization, is particularly challenging as the amount of information grows. Information that is actively being used is often maintained on local or shared network drives and/or in cloud file sharing sites, for example. As space is needed, files that have not been accessed or modified for an extended period of time are often archived to make space available for new information.

A variety of content management systems designed for archiving digital files are available. However, these content management systems do not provide content management capabilities throughout an entire information lifecycle. For example, these systems lack retention management capabilities and, therefore, archived information that is no longer needed is often not purged. Storing content indefinitely increases the cost of maintaining an archive.

Additionally, these systems often store information in hierarchical structures which depend upon adherence by everyone across an enterprise or the information becomes difficult to find, particularly for someone without knowledge the information was created at all. With current content management platforms, finding digital information is essentially no easier that finding paper documents in that unless a user knows what the content was called and where it was stored, the information very quickly becomes difficult to find. As the content ages, the time and effort required to find information in a hierarchical structure increases. The stored information is a digital asset of the organization, but finding it, or even knowing it exists after a relatively short period of time, is often problematic.

While some current content management systems have search capabilities, the capabilities are typically limited to file name searches as well as basic keyword searches. Accordingly, organizations often utilize data mining, content analytics, and/or e-discovery software, for example, to find content. These software tools are expensive, and therefore generally utilized only by large organizations, and are not designed for continued management of the archived content. Additionally, the search capabilities of current content management systems and software tools suffer from the inability of the content management systems to effectively ingest heterogeneous types of content, some of which may not be amenable to keyword or any other more robust or comprehensive types of searching in its ingested or native form.

Current content management systems also do not provide access management at an individual file level and otherwise lack effective access control and monitoring functionality. Accordingly, accessing archived content often requires administrator intervention in order to maintain confidentiality and security of the content, which is undesirable and an inefficient use of an organization's resources.

SUMMARY

A method for facilitating preservation and retrieval of heterogeneous content includes receiving, with a content management apparatus, a storage request including content and context information associated with the received content, the context information comprising at least metadata and information for one or more user tags, wherein the user tags are customizable and established by an administrator. One of a plurality of types of content is identified, with the content management apparatus, for the received content. Searchable information is extracted, with the content management apparatus, from the received content based on the identified one of the plurality of types of content. A searchable index is generated, with the content management apparatus, for the received content based on at least the extracted searchable information and the context information associated with the received content. The received content is stored, with the content management apparatus, in a manner which is retrievable based on one or more associations in the generated searchable index.

A non-transitory computer readable medium having stored thereon instructions for facilitating preservation and retrieval of heterogeneous content comprising machine executable code which when executed by a processor, causes the processor to perform steps including receiving a storage request including content and context information associated with the received content, the context information comprising at least metadata and information for one or more user tags, wherein the user tags are customizable and established by an administrator. One of a plurality of types of content is identified for the received content. Searchable information is extracted from the received content based on the identified one of the plurality of types of content. A searchable index is generated for the received content based on at least the extracted searchable information and the context information associated with the received content. The received content is stored in a manner which is retrievable based on one or more associations in the generated searchable index. All content can be authenticated to ensure it has not been altered since it was ingested.

A content management apparatus includes a processor coupled to a memory and configured to execute programmed instructions stored in the memory including receiving a storage request including content and context information associated with the received content, the context information comprising at least metadata and information for one or more user tags, wherein the user tags are customizable and established by an administrator. One of a plurality of types of content is identified for the received content. Searchable information is extracted from the received content based on the identified one of the plurality of types of content. A searchable index is generated for the received content based on at least the extracted searchable information and the context information associated with the received content. The received content is stored in a manner which is retrievable based on one or more associations in the generated searchable index.

This technology provides a number of advantages including methods, non-transitory computer readable medium, and content management apparatus that ingest heterogeneous content and context information, including metadata and information for predefined user tags, extract searchable information, and generate a searchable index. The ingested content is preserved securely, in a searchable form, and in a manner accessible to end users based on predefined roles and privileges. Optionally, retention management capabilities can also be provided. Accordingly, with this technology, heterogeneous content can be advantageously preserved and managed across the information lifecycle.

BRIEF DESCRIPTION OF THE DRAWINGS

FIG. 7 is a screenshot of an exemplary display window provided by a content management agent for establishing a watch folder for automatically generating storage requests;

FIG. 9 is a screenshot of an exemplary administrator audit interface for obtaining audit parameters associated with actions taken by a user and providing an audit report.

DETAILED DESCRIPTION

Figure 1:
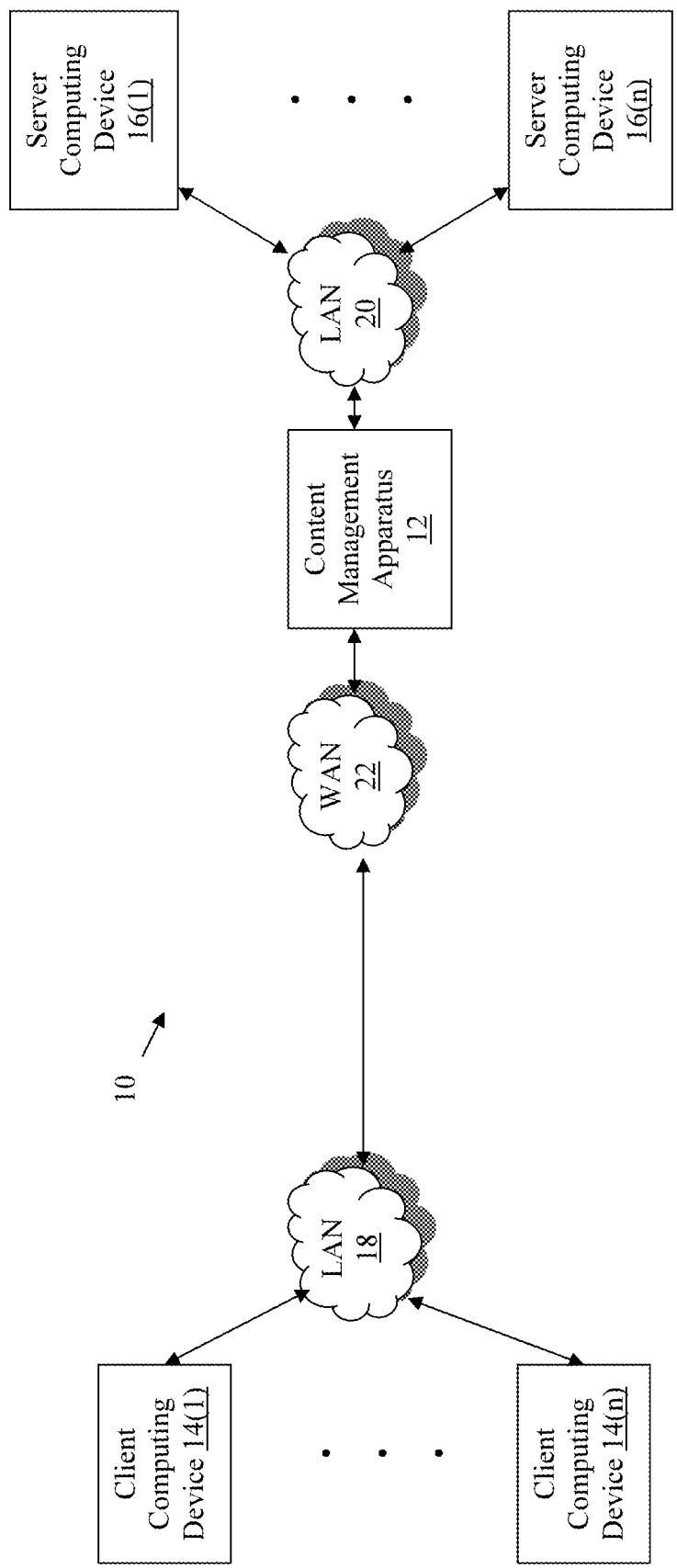
FIG. 1 is a block diagram of a network environment which incorporates an exemplary content management apparatus.
Figure 2:
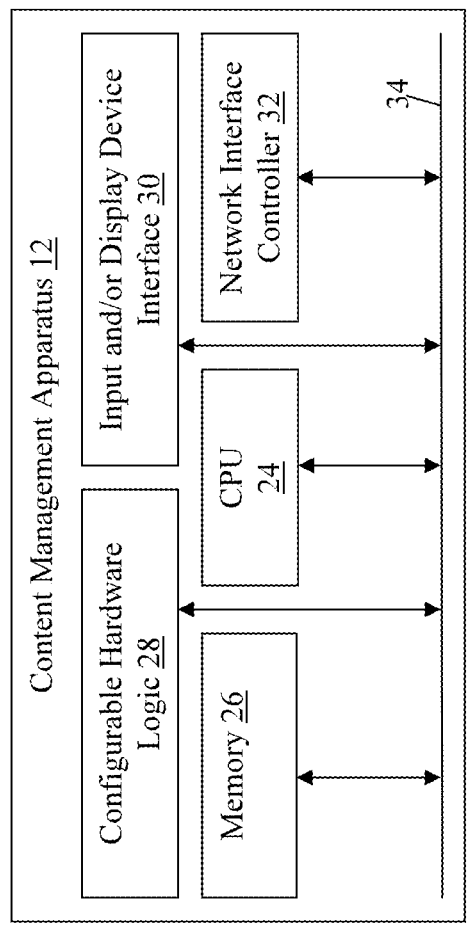
FIG. 2 is a block diagram of the exemplary content management apparatus.

An exemplary network environment 10 with a content management apparatus 12, client computing devices 14(1)-14(n), and server computing devices 16(1)-16(n) is illustrated in FIGS. 1 and 2. In this example, the content management apparatus 12, client computing devices 14(1)-14(n), and server computing devices 16(1)-16(n) are coupled together by local area networks (LANs) 18 and 20 and wide area network (WAN) 22, although other types and numbers of systems, devices, components and other elements in other configurations which are coupled together in other manners can be used. This technology provides a number of advantages including methods, non-transitory computer readable medium, and apparatus that more effectively secure, manage, control, and facilitate retrieval of unstructured content.

Referring more specifically to FIGS. 1 and 2, the content management apparatus 12 is coupled to the client computing devices 14(1)-14(n) by the LAN 18 and WAN 20. In this example, the content management apparatus 12 is further coupled to the server computing devices 16(1)-16(n) by the LAN 20. While not shown, the environment 10 also may include additional network components, such as routers, switches and other devices, which are well known to those of ordinary skill in the art and thus will not be described here.

The content management apparatus 12 may perform any number of functions, such as servicing request for storing unstructured content from the client computing devices 14(1)-14(n) and securing, managing, controlling, and servicing search and retrieval requests for content stored by the server computing devices 16(1)-16(n). The content management apparatus 12 includes at least one processor or CPU 24, a memory 26, optional configurable hardware logic 28, an input and/or display device interface 30, and a network interface controller 32 which are coupled together by a bus 34, although the content management apparatus 12 may include other types and numbers of elements in other configurations. In this example, the bus 36 is a hypertransport bus, although other bus types and links may be used, such as PCI.

The processor 24 of the content management apparatus 12 may execute one or more computer-executable instructions stored in the memory 26 of the content management apparatus 12 for managing content. The processor 24 of the content management apparatus 12 may comprise one or more central processing units (CPUs) or general purpose processors with one or more processing cores, such as AMD® processor(s), although other types of processor(s) could be used (e.g., Intel®).

The memory 24 of the content management apparatus 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26.

The optional configurable hardware logic 30 of the content management apparatus 12 may comprise specialized hardware configured to implement one or more steps of this technology as illustrated and described with reference to the examples herein. By way of example only, the optional configurable hardware logic 30 may comprise one or more of field programmable gate arrays (FPGAs), field programmable logic devices (FPLDs), application specific integrated circuits (ASICs), and/or programmable logic units (PLUs).

The input and display device interface 30 of the content management apparatus 12 enables a user, such as an user or an administrator, to interact with the content management apparatus 12, such as to input and/or view data and/or to configure, program and/or operate it by way of example only. Input devices configured to communicate with the input and/or display device interface 30 may include a keyboard and/or a computer mouse and display devices configured to communicate with the input and/or display device interface 30 may include a computer monitor, although other types and numbers of input devices and display devices could also be used.

The network interface controller 32 operatively couples and communicates between the content management apparatus 12, the client computing devices 14(1)-14(n), and server computing devices 16(1)-16(n), which are all coupled together by the LANs 18 and 20 and WAN 22, although other types and numbers of communication networks or systems with other types and numbers of connections and configurations to other devices and elements. By way of example only, the LANs 18 and 20 and WAN 22 can use TCP/IP over Ethernet and industry-standard protocols, including NFS, CIFS, SOAP, XML, LDAP, and SNMP, although other types and numbers of communication networks can also be used.

The LANs 18 and 20 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 22 may comprise any wide area network (e.g., the Internet), although any other type of network topology may be used.

Each of the client computing devices 14(1)-14(n) and server computing devices 16(1)-16(n) includes a central processing unit (CPU) or processor, a memory, a network interface device, and an I/O system, which are coupled together by a bus or other link, although other numbers and types of network devices could be used. The client computing devices 14(1)-14(n) may run interface application(s), such as a Web browser and/or a content management agent, that may provide an interface to make requests for storing unstructured content and receive content stored on one or more of the server computing devices 16(1)-16(n) via the LANs 18 and 20 and/or WAN 22 in response to retrieval requests for the content.

Generally, the server computing devices 16(1)-16(n) process requests received from requesting client computing devices 14(1)-14(n) via the LANs 18 and 20 and/or WAN 22 and the content management apparatus 12 according to the HTTP-based application RFC protocol or the CIFS or NFS protocol for example. The server computing devices 16(1)-16(n) may provide data or receive data in response to requests directed toward applications on the server computing devices 16(1)-16(n) from the client computing devices 14(1)-14(n). Various network processing applications, such as CIFS applications, NFS applications, HTTP Web Server applications, and/or FTP applications, may be operating on the server computing devices 16(1)-16(n). The various applications can be configured to transmit content to the client computing devices 14(1)-14(n) in response to retrieval requests for the content from the client computing devices 14(1)-14(n) and/or receive unstructured content from the client computing devices 14(1)-14(n) in response to storage requests from the client computing devices 14(1)-14(n).

The server computing devices 16(1)-16(n) may be hardware or software or may represent a system with multiple server computing devices 16(1)-16(n) in a server pool, which may include internal or external networks. In this example the server computing devices 16(1)-16(n) may be any version of Microsoft® IIS servers or Apache® servers, although other types of server computing devices 16(1)-16(n) may be used. Further, additional server computing devices 16(1)-16(n) may be coupled to one of the LANs 18 and 20 and many different types of applications may be available on each of the server computing devices 16(1)-16(n).

Although an exemplary network environment with the content management apparatus 12, client computing devices 14(1)-14(n), server computing devices 16(1)-16(n), LANs 18 and 20 and WAN 22 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and network traffic technologies.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

An exemplary method for facilitating preservation and retrieval of heterogeneous content will now be described with reference to FIGS. 1-3. In this example, in step 300, the content management apparatus 12 obtains user tags and user parameters. The user tags are customizable, established by an administrator, and based on characteristics or attributes of content not otherwise included in metadata. In some examples, the user tags include a category, one or more subcategories, a retention period, a description, one or more notes, and/or one or more index fields, although other user tags can also be used. The information associated with the user tags can be used to provide a more effective search for a file, as described and illustrated in more detail below.

Figure 4:
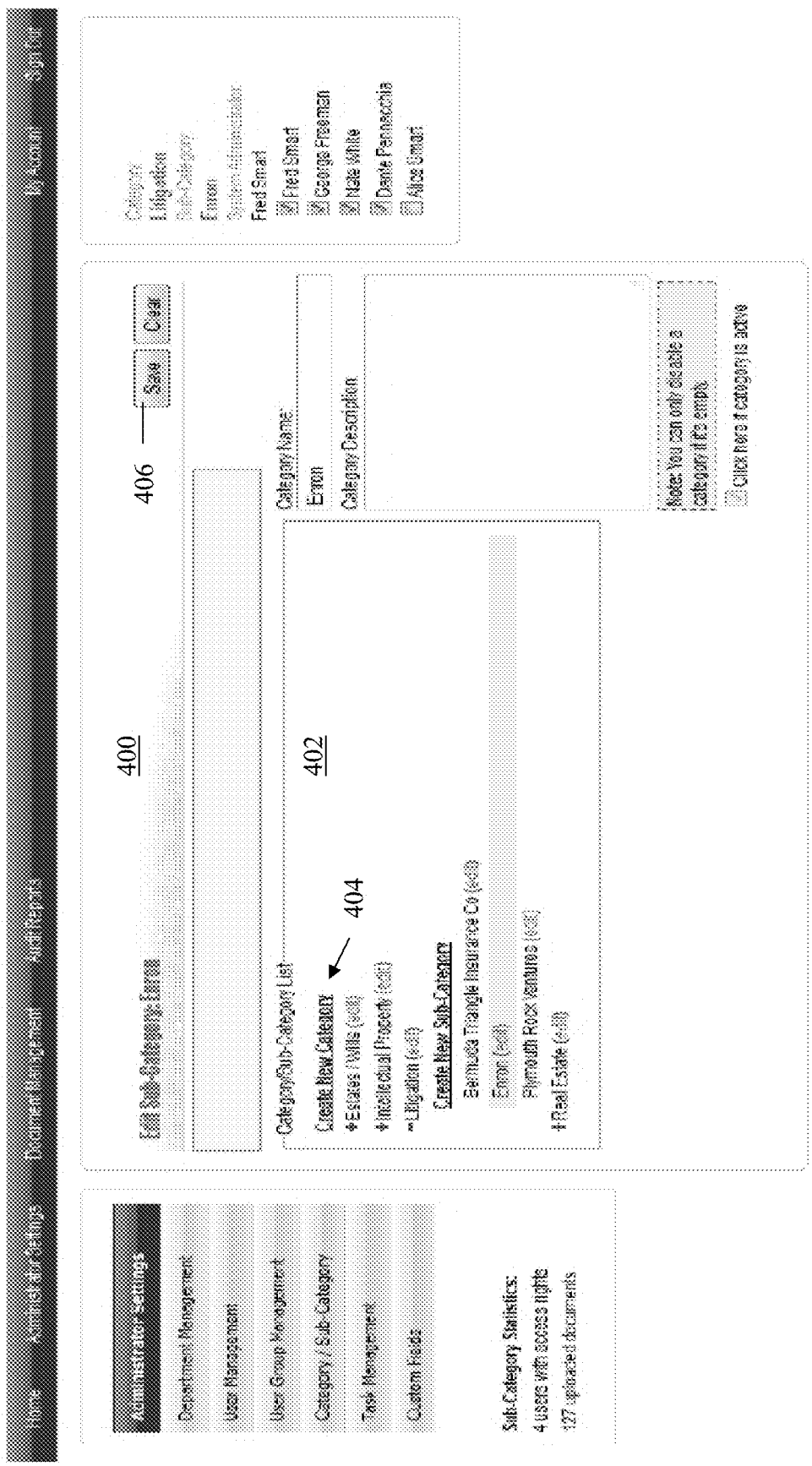
FIG. 4 is a screenshot of an exemplary administrator category management interface for obtaining category and subcategory user tags.

Referring to FIG. 4, a screenshot of an exemplary administrator category management interface 400 for obtaining category and subcategory user tags is illustrated. In this example, upon authenticating login credentials submitted by an administrator using one of the client computing devices 14(1)-14(n), the content management apparatus 12 sends one or more web pages to the one of the client computing devices 14(1)-14(n). The web pages each include at least one management interface for establishing and modifying various options and settings, user tags, and/or user parameters by an administrator. The options and settings are used by the content management apparatus 12 to preserve and manage retrieval of content stored by the server computing devices 16(1)-16(n), for example, as well as provide reports including audit reports, as described and illustrated in more detail later.

The exemplary administrator category management interface 400 includes a category and subcategory list 402 including a create a new category link 404. Upon interaction with the create new category link 404, the administrator can input a category name and optional description. Sub categories can also be established by an administrator in a similar manner. In the example illustrated in FIG. 4, the categories correspond with various practice areas of a law firm and the subcategories correspond to various matters associated with the practice area categories, although the categories and subcategories can be used by any type of organization and can correspond to other types of groups or structures. Upon selection of the save button 406 by the administrator, the names and descriptions of categories and subcategories, including any new and/or modified categories or subcategories, can be communicated to the content management apparatus 12 and stored in the memory 26, for example.

Figure 5:
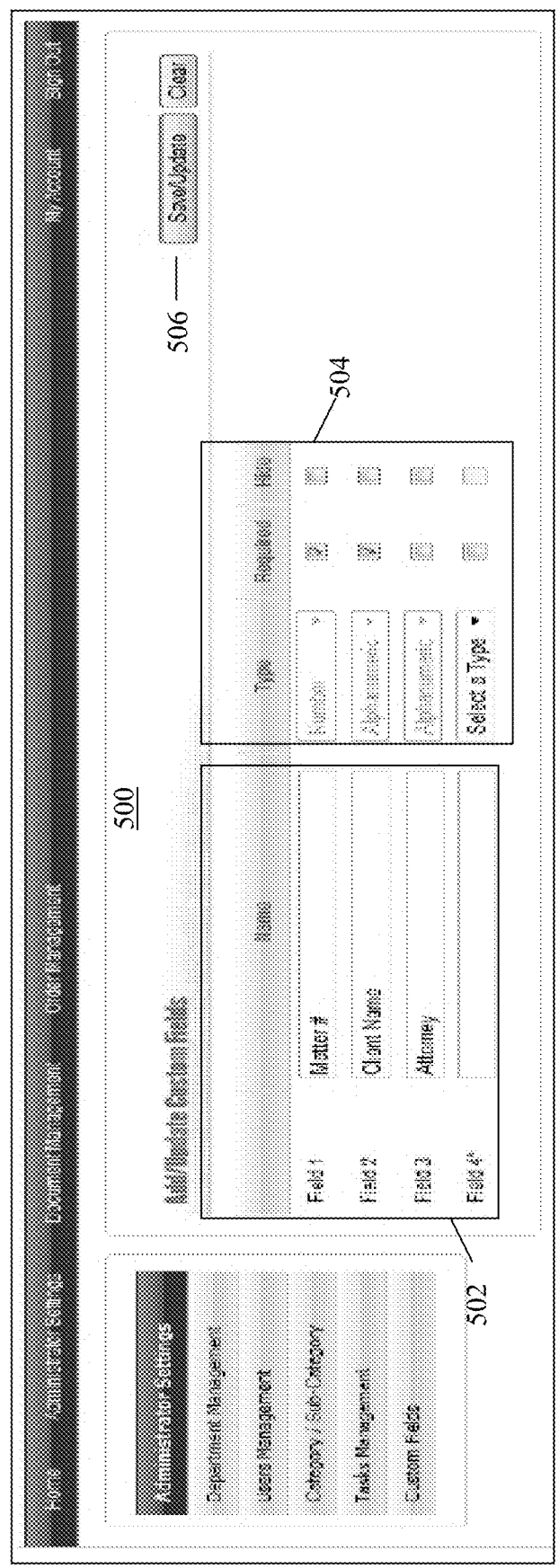
FIG. 5 is a screenshot of an exemplary administrator index field management interface for obtaining index field user tags.

Referring to FIG. 5, a screenshot of an exemplary administrator index field management interface 500 for obtaining index field user tags is illustrated. In this example, the administrator index field management interface 500 includes a plurality of name fields 502 for obtaining names of index fields and optional parameter fields 504 for obtaining parameters associated with the index fields. In this example, the administrator has inserted "Matter #", "Client Name", and "Attorney" names into a subset of the name fields 502. The parameter fields 504 allow the administrator to indicate the data type (e.g., number or alphanumeric) of information associated with the index fields as well as whether the index fields are required or hidden, although other names, data types, and parameter fields can also be used. Upon selection of the save button 506 by the administrator, the index field names and parameters can be communicated to the content management apparatus 12 and stored in the memory 26, for example.

Other interfaces and/or methods of obtaining user tags from an administrator and other user tags and/or parameters can also be used. Additionally, in other examples, user tags are generated by users other than the administrator or are auto-generated by content analytics, indexing, coding, e-discovery software, and/or other software configured to traverse bulk content and generate custom tags that identify or categorize the content.

Figure 6:
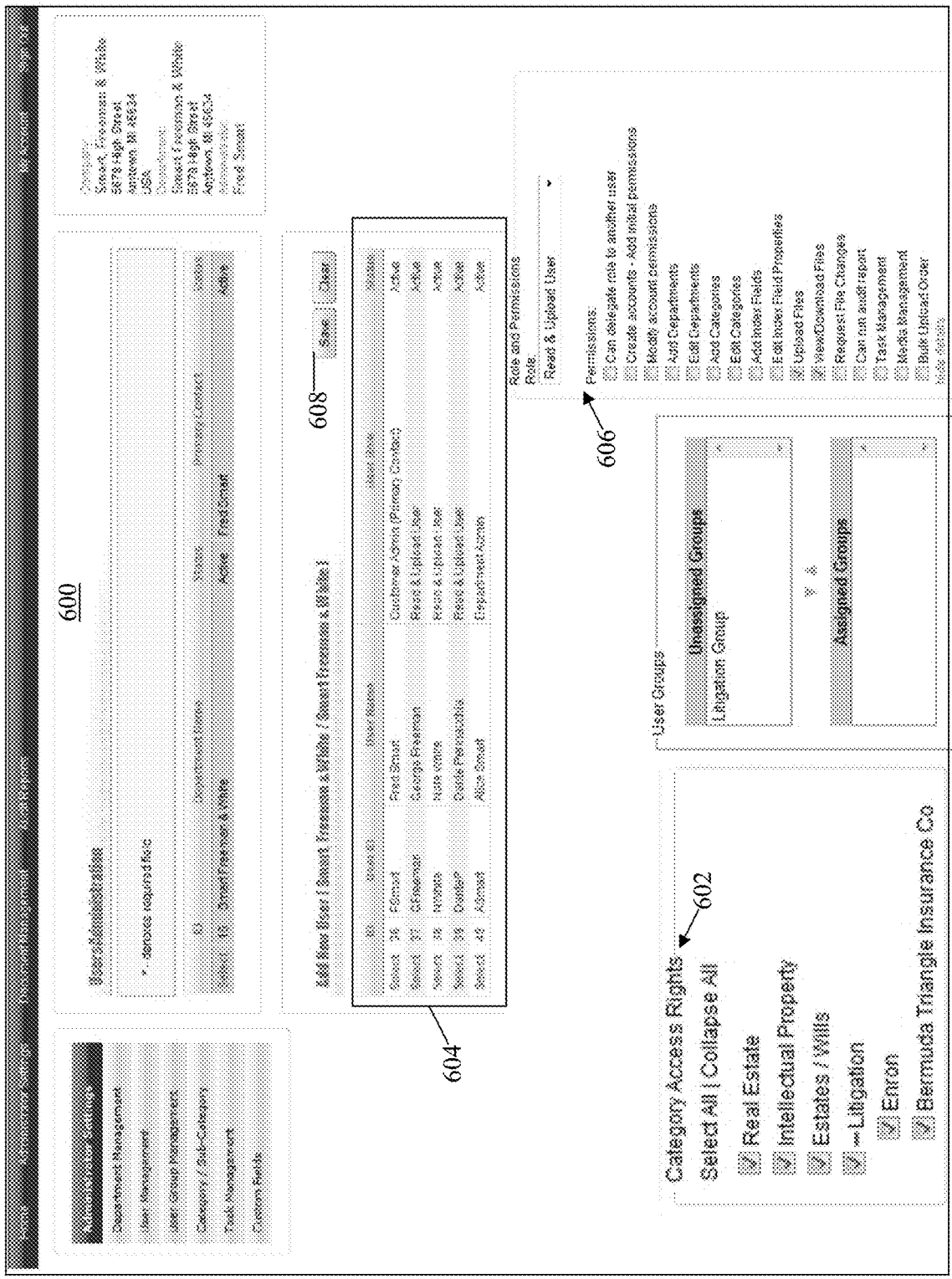
FIG. 6 is a screenshot of an exemplary administrator user parameter interface for obtaining user parameters.

Referring to FIG. 6, a screenshot of an exemplary administrator user parameter interface 600 for obtaining user parameters is illustrated. In this example, the user parameters include at least a user name, category access rights and permissions, and optionally include user groups. In some examples, a user of one of the client computing devices 14(1)-14(n) can submit a request to the content management apparatus 12 to become a user. The request can be reviewed by an administrator of the content management apparatus 12 and the administrator can interact with the administrator user parameter interface 600 to establish parameters associated with the user. In other examples, an administrator of the content management apparatus 14 establishes the user parameters without receiving any user request In this example, the category access rights 602 include a list of the category and subcategory names, obtained as described and illustrated earlier, and a corresponding check box for each of the category and subcategory names. Upon selecting one of the users in the user list 604, an administrator of the content management apparatus 12 can select or deselect a category to indicate whether a user is associated with a category. Association of a user with a category allows the user to access content associated with the category, assuming the user has the appropriate permissions, as described and illustrated later.

The administrator user parameter interface 600 in this example also allows an administrator of the content management apparatus 12 to indicate a role associated with a set of permissions or individual permissions for a user. In the example illustrated in FIG. 6, a check box corresponding to the permissions "Upload Files" and "View/Download Files" is selected in the list of permissions 606 indicating that the user can upload content, and view or download content, but cannot perform any of the other functions corresponding to other permissions which are not selected.

Accordingly, the category access rights and permissions restrict interactions of the users with the content managed by the content management apparatus 12. Optionally, user groups, each associated with a set of category access rights and/or permissions, can also be used and assigned to users to establish category access rights and/or permissions for the users. Upon selection of the save button 608, the content management apparatus 12 can save the user parameters in the memory 26, for example. Other methods for obtaining user parameters including category access rights and permissions can also be used.

In step 302, the content management apparatus 12 receives a storage request including content and context information associated with the received content from a user of one of the client computing devices 14(1)-14(n). The content can be any unstructured data that the user would like to preserve. Exemplary unstructured data includes text documents created by word processing software, scanned or digitized paper or analog documents in a portable data format (PDF), bitmaps or other images, videos, audio files, and/or electronic mail, for example, although other content and unstructured data can also be included in the storage request. The context information can include metadata associated with the content and information for one or more user tags, such as the user tags obtained in step 300, for example.

In one example, the sending and/or generating of the storage request is facilitated by a web page sent by the content management apparatus 12 to the one of the client computing devices 14(1)-14(n) subsequent to the user submitting authenticated login credentials. The web page can include an interface including a portion designated to provide drag-and-drop functionality. The portion of the web page is configured to receive content dragged by the user from local or network accessible storage and obtain a path of the content. In this example, the web page can include a plurality of input fields for receiving information for any user tags. Upon interaction with a submit button, for example, a storage request including the content retrieved from the path and the context information is generated and sent to the content management apparatus 12.

In another example, the user of the one of the client computing devices 14(1)-14(n) can request a content management agent from the content management apparatus 12. In response, the content management can retrieve a content management agent from the memory 26, for example, and send the content management agent to the requesting one of the client computing devices 14(1)-14(n) where it is stored in local memory. The content management agent can be a computer application executable by a processor of the one of the client computing devices 14(1)-14(n).

In one example, when executed, the content management agent can interface with an operating system of the one of the client computing devices 14(1)-14(n) to provide right-click upload functionality, for example. In this example, the content management agent allows the user of the one of the client computing devices 14(1)-14(n) to right click on a file on local or network accessible storage and select a menu option configured to display input fields corresponding to the user tags. Upon the user of the one of the client computing devices 14(1)-14(n) inputting the information for the user tags and selecting a submit button, for example, the content management agent generates the storage request and sends the storage request to the content management apparatus 12.

Figure 7:
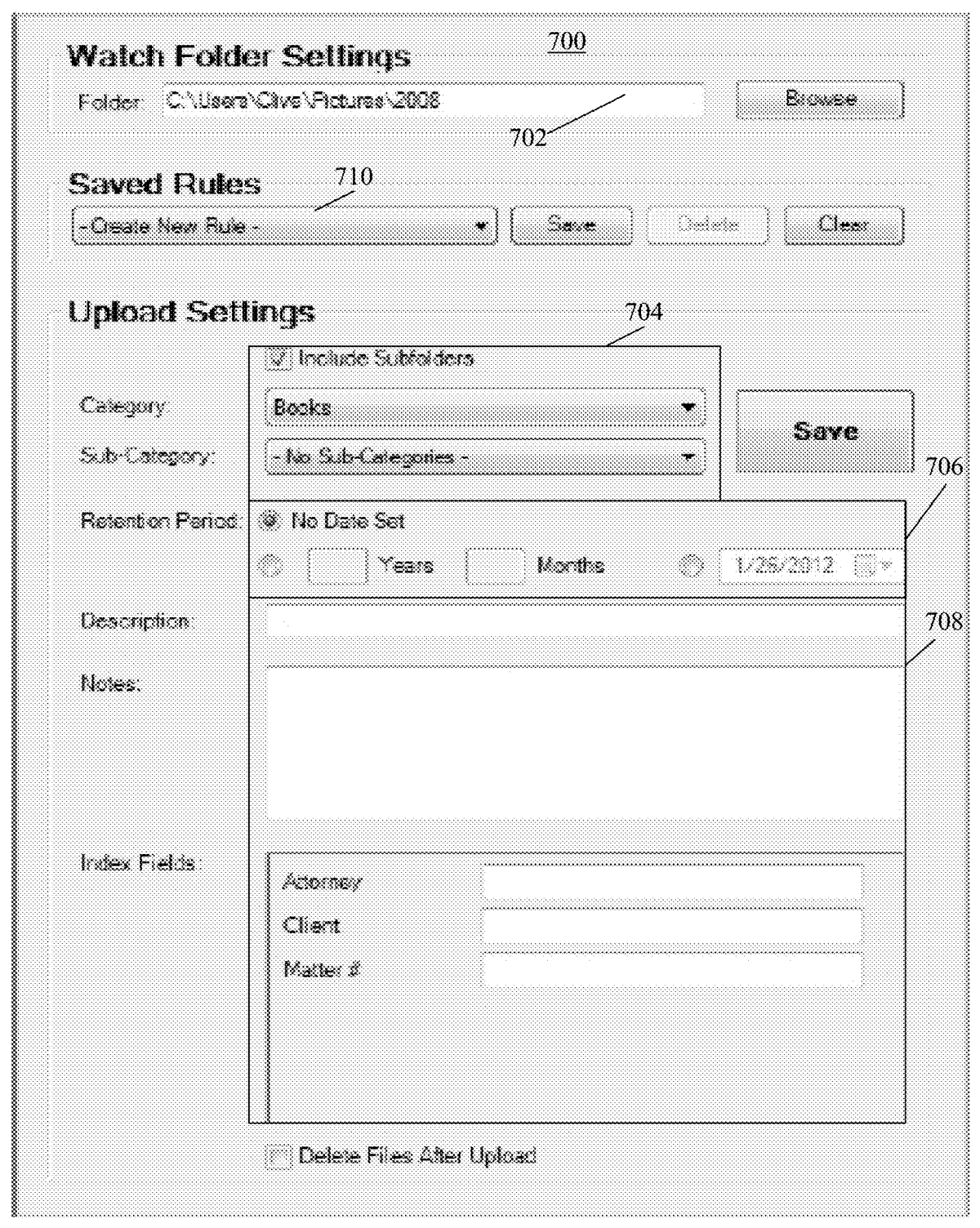

In another example, the content management agent, when executed, can facilitate designation of a local or network accessible folder as a watch folder. Referring to FIG. 7, a screenshot of an exemplary display window 700 provided by the content management agent for establishing a watch folder for automatically generating storage requests is illustrated. In this example, the display window 700 includes input elements including fields, radio buttons, and drop-down menus, although any type and number of input elements can be used.

In this example, the display window 700 also includes a folder input field 702 configured to receive a path name of a folder in local or network accessible storage, for example, to be designated as a watch folder. Other input elements of the display window 700 correspond to the user tags. In this example, the input elements include category and subcategory drop-down menus 704, a plurality of retention period input elements 706, and text box input fields 708 for description, notes, and index fields, although other input elements and corresponding user tags can also be used.

Upon interaction by the user of the one of the client computing devices 14(1)-14(n) with the save button 710, for example, the content management agent can store the set of information submitted using the input elements as associated with the folder indicated in the folder input field 702, such as in memory of the one of the client computing device 14(1)-14(n), for example. Accordingly, the folder will be considered by the content management agent as a watch folder associated with an established set of information for the user tags.

Subsequent to establishing the watch folder, the content management agent can automatically generate a storage request for any content currently or subsequently stored in the watch folder. The context information included in each of the automatically generated storage requests can be based on the established set of information associated with the folder in the memory of the one of the client computing device 14(1)-14(n). Optionally, the display window 700 can include a rule menu 710 configured to facilitate generation of a rule by the user of the one of the client computing devices 14(1)-14(n). A rule can be associated with established information for each of the user tags and can allow multiple folders to be associated with the same set of information without entering the information into the input elements for each watch folder.

In other examples, other methods of generating storage requests can also be used. Optionally, with the exception of the folder input field 702, the same input elements can be presented to a user in the drag-and-drop or right click methods of generating a storage request for a file described and illustrated earlier. In each of the examples, the user tags can be retrieved by the content management agent from the content management apparatus 12 and the input elements can be generated based on default rules or according to the data type associated with each of the user tags, for example. Accordingly, with this technology, submission of content for preservation requires limited time and effort and users are not required to log in to a content management system for each submission of content. Instead, users can log in to the content management agent and thereafter utilize interfaces and/or functionality provided by the content management agent.

Referring back to FIG. 3, in step 304, the content management apparatus 12 identifies one of a plurality of types of content for the content included in the storage request received in step 302. The content management apparatus 12 can be configured to analyze the content and/or one or more portions of the context information included in the search request, including any metadata associated with the content, to identify the type of content. For example, a file extension of the content may indicate a bitmap, image, PDF or other graphic type of content, a text document, or an electronic mail, for example. In other examples, the content itself can be parsed to identify the type of content. Other methods of identifying the type of content can also be used.

In step 306, the content management apparatus 12 extracts searchable information from the received content based on the identified one of the plurality of types of content. In one example, the identified one of the plurality of types of content is a bitmap, image, graphic, or portable data format (PDF). In this example, in order to extract searchable information, the content management apparatus 12 performs an optical character recognition (OCR) technique on the received content to extract text included therein. In another example, the identified one of the plurality of types of content is text, such as in the case of a word processing document, for example. In this example, in order to extract searchable information, the content management apparatus 12 parses the received content to extract text included therein.

In yet another example, the identified one of the plurality of types of content is an electronic mail. In this example, the extracting searchable information includes retrieving any attachments to the electronic mail and extracting searchable information from both the electronic mail and the attachments. In order to extract searchable information, the content management apparatus 12 can parse the electronic mail to extract text included therein. Additionally, the content management apparatus 12 can identify a type of content for each of the attachments and extract searchable information based on the identified type(s) of content, such as described and illustrated earlier, for example. Other types of content can be identified and other methods for extracting searchable information can also be used.

In step 308, the content management apparatus 12 optionally generates information for one or more system tags. The information for the system tags can include the time and date the storage request including the content was received by the content management apparatus 12 in the form of a time stamp, for example. In other examples, the information for the systems tags includes an indication of a name and/or other attribute(s) of a user and/or one of the client computing devices 14(1)-14(n) from which the storage request including the content was received by the content management apparatus 12. Other information for other system tags can also be used.

In step 310, the content management apparatus 12 generates a searchable index for the received content based on at least the extracted searchable information and the context information associated with the received content and, optionally, the information for the system tags. In this example, in order to generate the searchable index, the content management apparatus 12 can generate a unique identifier for the content. The unique identifier is then associated with the original received content, any searchable information extracted in step 306, each portion of metadata included in the storage request received in step 302, each portion of information for the user tags included in the storage request received in step 302, and, optionally, each portion of information for the system tags generated in step 308. Other methods of generating a searchable index can also be used.

Accordingly, with this technology, searchable information is advantageously extracted from heterogeneous types of content. The extracted information is included, along with metadata and user and system tag information, in a searchable index used to retrieve content, as described and illustrated later with reference to steps 316-324.

In step 312, the content management apparatus 12 optionally generates, from the content included in the storage request received in step 302, one or more preservation objects. The preservation objects can include an archival editable format file, an archival viewable format file, and/or a text file including text included in the content and/or extracted in step 306. The content management apparatus 12 can selectively generate a preservation object upon determining the content included in the storage request received in step 302 is in a proprietary format. Content in the proprietary format is relatively less likely to be accessible to other users who may not have access to the proprietary computer application required to view the content, particularly as the content has aged such that the proprietary computer application is no longer available.

In one example, a file in an open standard format file, such as an Open Document Format for Office Application or OpenDocument (ODF) format, for example, can be generated by the content management apparatus 12 from word processing document content in a proprietary format. In another example, a file in a PDF for Archive (PDF/A) format can be generated by the content management apparatus 12 from PDF, image, or graphic content, such as a digitally scanned paper document, for example. In yet another example, a text document in a standard format (e.g., ".txt") can be generated by the content management apparatus 12 from the content included in the storage request received in step 302. Additionally, the content management apparatus 12 signs the content included in the storage request received in step 302 and the one or more preservation objects with a respective digital signature to increase security of the content. This, along with a time stamp of one of the system tags recording when the content was first ingested, can be used to authenticate that the content has not been modified since it was ingested.

In step 314, the content management apparatus 12 stores the content included in the storage request received in step 302 in one or more of the server computing devices 16(1)-16(n). Additionally, in this example, the context information, searchable index, preservation object(s) and, optionally, information for system tag(s) is also stored on one or more of the server computing devices 16(1)-16(n). In examples in which the content and/or preservation object(s) are digitally signed, the content management apparatus 12 can also store each of the digital signatures, which can be used for authentication of the objects, for example.

Optionally, the searchable index is stored by the content management apparatus 12 in the form of a search database. Additionally, some or all of the stored content, information, object(s), and/or the searchable database can also be stored in the memory 26 of the content management apparatus 12. In this example, the received content is stored such that it is retrievable based on one or more associations in the searchable index generated in step 310, such as based on the unique identifier used by the content management apparatus 12 to generate the searchable index.

In examples in which a retention period user tag is obtained in step 300, upon storing the context information, the content management apparatus 12 can also use the information for the retention period user tag to establish a retention date. The retention date can be a future date in which the content included in the storage request should be reviewed by an administrator to take an appropriate action which may include extending the retention date or purging the content.

In these examples, the content management apparatus 12 determines the retention date based on a current date and a time period included in the information for the retention period user tag included in the storage request. The content management apparatus then periodically determines whether a current date is equivalent or subsequent to the retention date. If the content management apparatus 12 determines that the current date is equivalent or subsequent to the retention date, the content management apparatus 12 provides a notification to the administrator or automatically purges the content according to preferences set by the administrator, for example. In examples in which a notification is generated and sent to the administrator, the notification can be in the form of an electronic mail, for example. Upon receiving the notification, the administrator can determine whether the content should be purged or some other action should be taken.

If the content management apparatus 12 determines that the current date is not equivalent or subsequent to the retention date, then no action is taken. Other methods of establishing a retention date and others actions taken in response to determining a retention date has been reached can also be used. Accordingly, in these examples, the content management apparatus 12 advantageously provides content retention capabilities and associated full information lifecycle management of the preserved content.

In step 316, the content management apparatus 12 receives a search request including search parameter(s) from a user of one of the client computing devices 14(1)-14(n). The search parameter(s) can include keyword(s), an indication of which of the content, metadata, user tag(s), and/or system tag(s) include the keyword(s), and/or one or more search features, for example, although other search parameter(s) can also be used.

Figure 8:
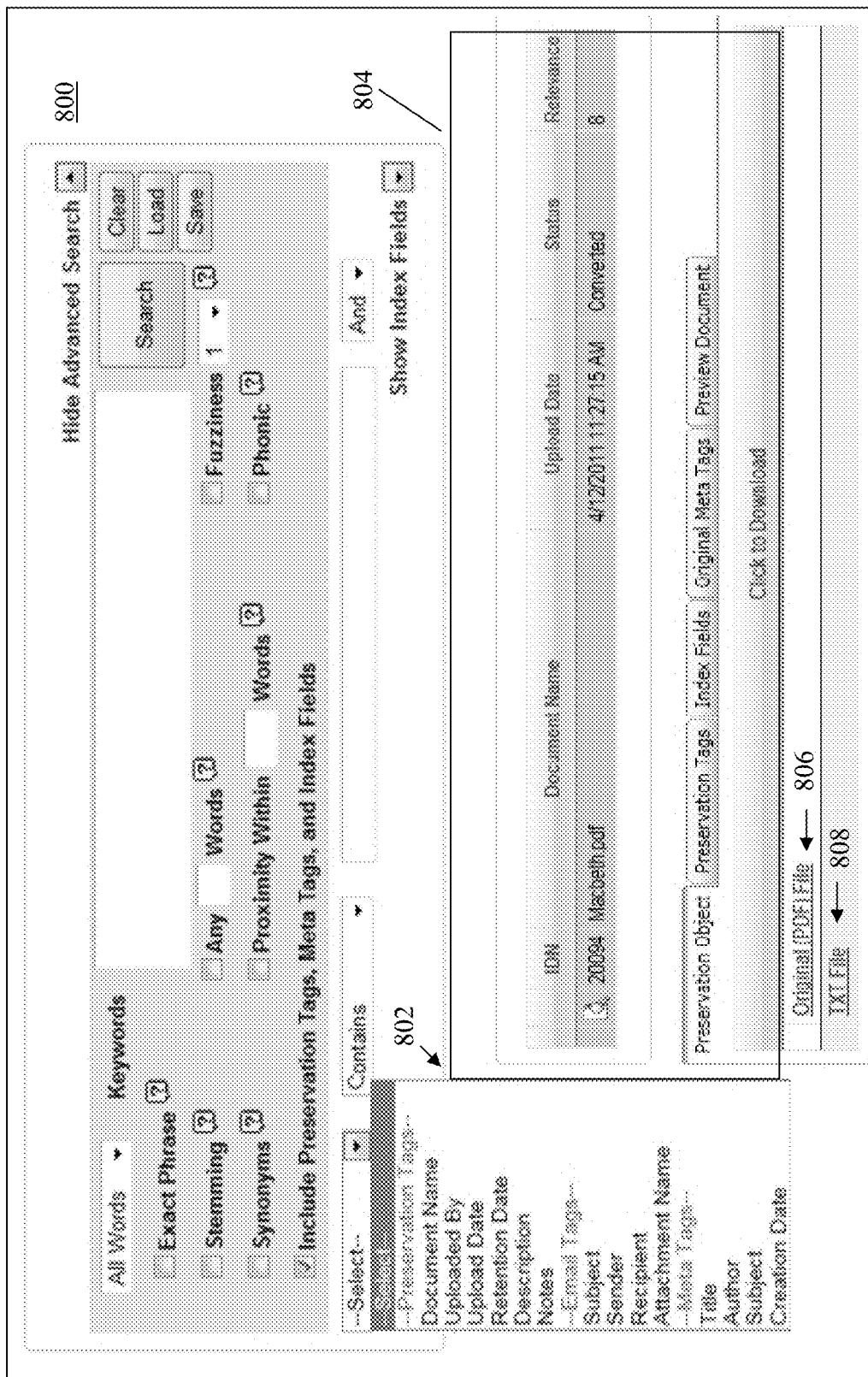
FIG. 8 is a screenshot of an exemplary user interface for obtaining search requests and providing access to and information associated with search results.

Referring to FIG. 8, a screenshot of an exemplary user interface 800 for obtaining search requests and providing access to, and information associated with, search results is illustrated. The user interface 800 can be provided to the requesting one of the client computing devices 14(1)-14(n) in the form of a web page, for example, although other methods of providing the user interface 800 can also be used. Optionally, the user interface 800 is provided subsequent to the user submitting authenticated login credentials to the content management apparatus 12. In order to increase the security of the communications between the one of the client computing devices 14(1)-14(n) and the content management apparatus 12, in some examples, the user is connected and authenticated via a Secure Sockets Layer (SSL) connection or other secure connection, for example.

In this example, robust search capabilities are provided and the user of the one of the client computing devices 14(1)-14(n) can select one or more search features such as synonyms, stemming, proximity, phonetic, and/or fuzziness, for example, to be used in the search. In other examples, a semantic search feature is also provided. Additionally, in this example, the user of the one of the client computing devices 14(1)-14(n) can indicate whether user tags, systems tags and metadata should also be included in the search. Alternatively or in combination, the user can use a drop-down menu 802 to select a specific tag or metadata field in which to search. A user can also filter information based on any parameter(s), such as a category, upload date, user tag, email domain, document type, or other parameter(s) maintained by the content management apparatus 12.

In step 318, the content management apparatus 12 identifies content satisfying the search parameters using the searchable index and generates a result set including the identified content. Due to the extraction of searchable information from heterogeneous types of content by the content management apparatus 12 in step 306, the searchable index can advantageously be used to locate content, such as scanned paper documents, PDFs, and/or e-mail attachments, for example, that may not otherwise have been identified based on the keyword(s) of the search parameters.

Additionally, the content management apparatus 12 can facilitate search of information for customized user tags, such as notes or descriptions, for example thereby increasing the likelihood that content having an otherwise unknown file name is identified. Moreover, the content management apparatus 12 advantageously identifies content satisfying the search parameters using the searchable index and irrespective of any storage location of the content.

In step 320, the content management apparatus 12 retrieves category access rights and permissions associated with the user of the one of the client computing devices 14(1)-14(n) from which the search request was sent. The category access rights and permissions can be established by the administrator and stored by the content management apparatus 12, as described and illustrated earlier with reference to step 300.

In step 322, the content management apparatus 12 determines whether the user of the one of the client computing devices 14(1)-14(n) is authorized to view and/or download the content included in the result set. In this example, the content management apparatus 12 first determines whether the user is authorized to download and/or view any content based on the retrieved permissions. If the content management apparatus 12 determines that the user is not authorized to view and/or download any content, then the No branch is taken to step 316.

If the content management apparatus determines that the user is authorized to view and/or download content, then the content management apparatus 12 retrieves the information for the category user tag associated with each of the files included in the result set. The content management apparatus 12 then compares the retrieved information to the retrieved category access rights to determine whether each of the files is associated with a category accessible by the user. If the content management apparatus 12 determines that none of the files included in the result set are associated with a category accessible by the user, then the No branch is taken back to step 316. If the content management apparatus 12 determines at least one of the files included in the result set is associated with a category accessible by the user, then the Yes branch is taken to step 324.

In step 324, the content management apparatus 12 provides an indication of the file(s) included in the result set that the user of the one of the client computing devices 14(1)-14(n) is authorized to view and/or download. In this example, the indication of each of the file(s) is displayed by the content management apparatus 12 to the user in a search result panel 804 of the user interface 800. The search result panel 804 includes an indication of the document name ("Macbeth.pdf") of the one file in the result set in this example. Additionally, the search result panel includes a link to the original PDF file 806 and a link to a text file 808, which is a preservation object generated as described and illustrated earlier with reference to step 312.

Upon selection of one of the links 806 and 808 by the user, the one of the client computing devices 14(1)-14(n) can send a request for the content to the content management apparatus 12. In response, the content management apparatus 12 retrieves the requested content from the server computing devices 16(1)-16(n) and sends the retrieved content to the requesting one of the client computing devices 14(1)-14(n).

Optionally, the content management apparatus 12 can parse the requested content and insert a highlight of the keyword(s) included in the search parameters received in step 316. Other methods of providing a pinpoint of the searched keywords can also be used. Also optionally, the requested content can be encrypted or otherwise secured prior to being provided by the content management apparatus 12 to the requesting one of the client computing devices 14(1)-14(n). Additionally, steps 316-324 can occur in parallel for various search requests as well as in parallel to any of steps 300-314.

In some examples, the content management apparatus 12 can further be configured to maintain an audit trail and provide an audit report upon request by the administrator. In these examples, information regarding actions taken by users and/or administrators and/or actions taken with respect to stored content can be recorded by the content management apparatus 12, such as in the memory 26, for example.

Figure 9:
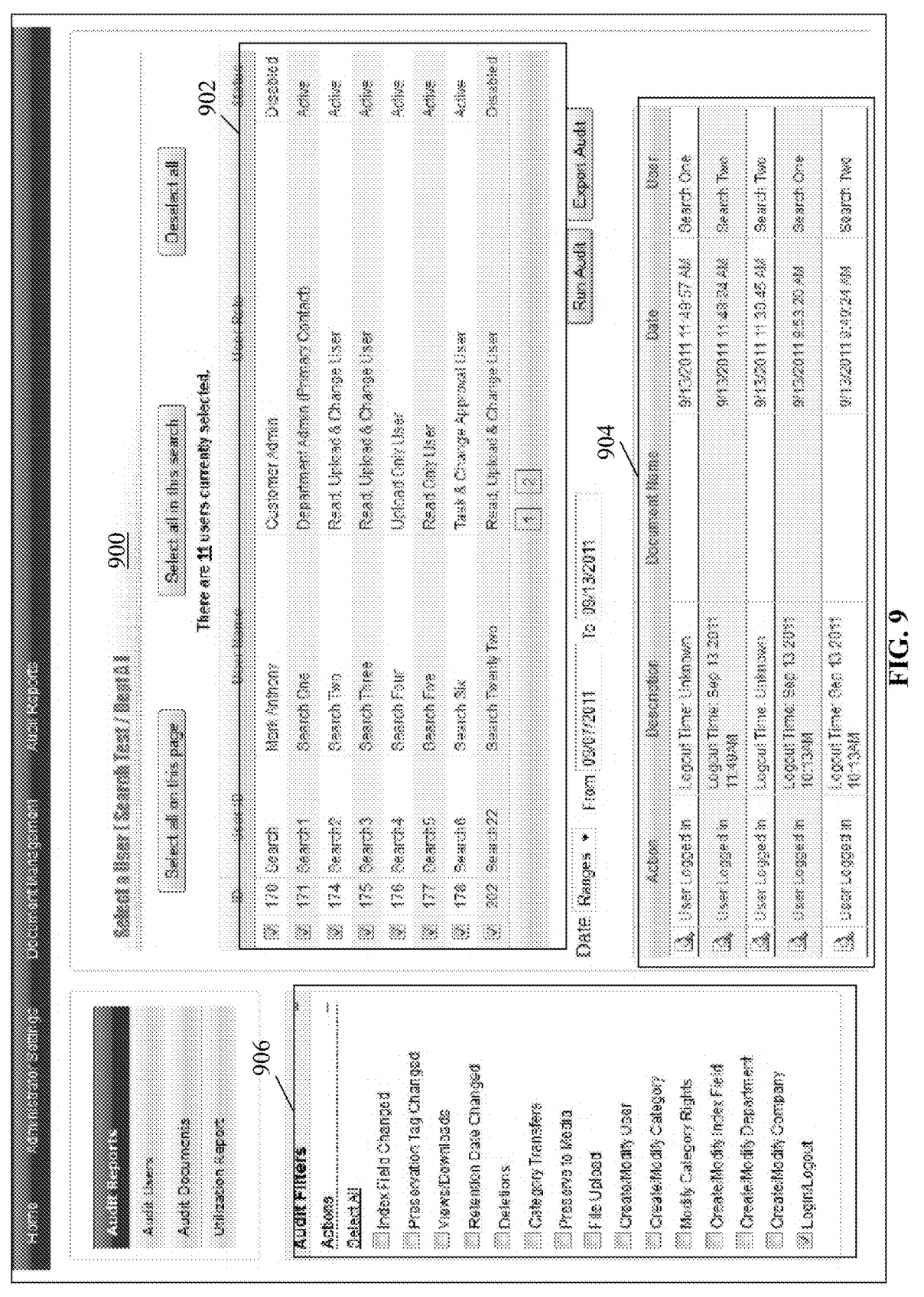

Referring to FIG. 9, a screenshot of an exemplary administrator audit interface 900 for obtaining audit parameters associated with actions taken by a user and providing an audit report is illustrated. The administrator audit interface 900 can be provided by the content management apparatus 12 in the form of a web page, for example. In this example, the administrator audit interface 900 includes a user panel 902 including a listing of users of the content management apparatus 12 and providing a checkbox associated with each user. By selecting one of the check boxes, the actions associated with the corresponding user are retrieved by the content management apparatus 12 and an audit report including the actions is displayed in an audit result panel 904. Optionally, audit parameters 906 are also provided in the administrator audit interface 900. In this example, the audit parameters 906 correspond to actions taken by users and can be selected or deselected to filter the actions provided in the audit report displayed in the audit result panel 904.

In other examples, the content management apparatus 12 provides an interface for obtaining parameters associated with actions taken with respect to stored content. In these examples, the interface can include search functionality, as described and illustrated earlier with respect to steps 316-324 and FIG. 8, which can be used to identify content for which the administrator can request an audit report. Accordingly, the audit capabilities provided by the content management apparatus 12 allow administrators and other users to track a plurality of actions thereby increasing the security and integrity of the preserved content.

Example

Referring to FIGS. 1-9, in one specific example, the content management apparatus 12 is used for the preservation and retrieval of human resource (HR) records of an organization. HR content can include a variety of different content types, different records need to be shared with different people at various times, and records need to be found based on a variety of different criteria, such as the type of documents that comprise the records or the employee to which the records belong.

Figure 3:
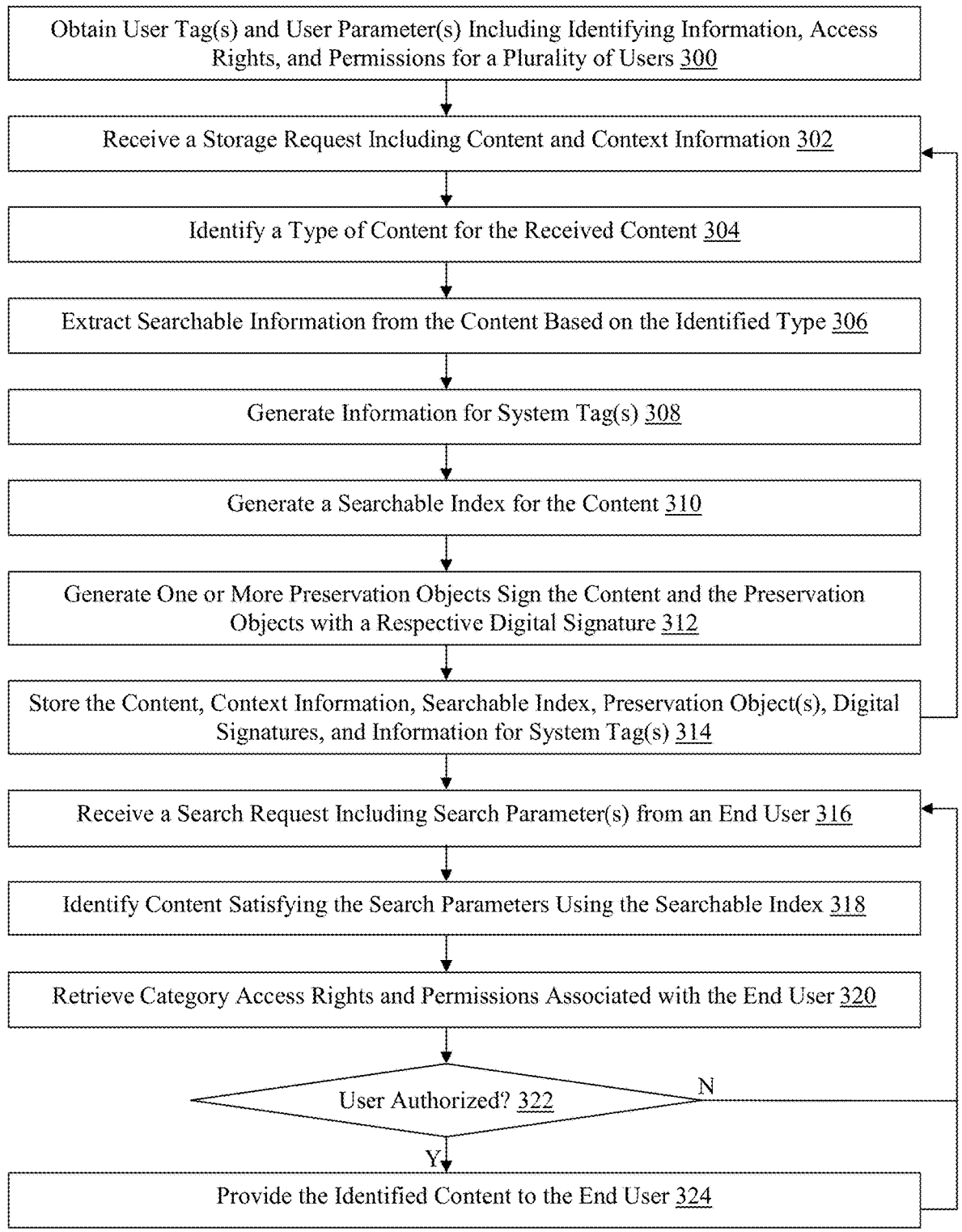
FIG. 3 is a flowchart of an exemplary method for facilitating preservation and retrieval of heterogeneous content.

Referring specifically to FIG. 3, in step 300 in this example, the content management apparatus 12 obtains user tags and user parameters including identifying information, access rights, and permissions for a plurality of users. The information is obtained using the administrator category management interface 400, administrator index field management interface 500, and administrator user parameter interface 600 and is stored in the memory 26. In this example, the user tags include an HR category, subcategories for recruiting documents, onboarding records, employee records, and termination records, a description index field, and an associated employee index field. The users include benefits professionals, hiring managers, and a chief human resources officer.

In this example, the benefits professional users have category access rights for the onboarding and termination records subcategories, the hiring manager users have category access rights for the recruiting documents and onboarding records subcategories, and the chief human resources officer has category access rights for the HR category, which includes all of the subcategories. Additionally, the benefits professional and hiring manager users have permission to upload and view/download files and the chief human resources officer has permission to add and edit categories, run audit reports, and create accounts in addition to permission to upload and view/download files.

In step 302, the content management apparatus 12 receives a storage request from one of the hiring manager users of one of the client computing devices 14(1)-14(n). The storage request includes an electronic mail with a resume attachment from an applicant for a position. The storage request also includes context information including user tag information specifying the HR category and recruiting documents subcategory, a description indicating the content includes a resume and an indication of the prospective employee's name. The storage request is automatically generated in response to the hiring manager user storing the electronic mail in a watch folder established using the display window 700. In other examples, the description can indicate a cover letter, background check, or offer letter, for example, for content in the recruiting documents subcategory.

Other content ingested by the content management apparatus 12 associated with the onboarding records subcategory can include I-9 forms, W-4 forms, benefits forms, and confidentiality agreements. Other content ingested by the content management apparatus 12 associated with the employee records subcategory can include performance appraisals, disciplinary actions, and training records. Additionally, the content management apparatus 12 can ingest exit interviews, and separation benefit documents tagged as associated with the termination records subcategory. These records typically take on many forms which include paper document, digital documents, and emails. For example, onboarding document such as resumes may be submitted to the company as either digital, which can be electronic mail attachments, or paper documents.

In step 302, the content management apparatus 12 identifies the type of content for the received content. In this example, the content management apparatus 12 identifies the content as an electronic mail such as based on a file extension or metadata included in the context information.

In step 306, the content management apparatus 12 extracts searchable information from the content based on the identified electronic mail type of content. In this example, the content management apparatus 12 parses the electronic mail to extract the sender, recipient, subject, and time and date the electronic mail was sent as well as the text of the body of the e-mail. Additionally, in this example, the content management apparatus retrieves the attachment and proceeds back to step 304 to process the attachment by first identifying the attachment as a text document, and then parsing the attached resume to extract the text recited therein.

In step 308, the content management apparatus 12 generates system tags including the time and date of receipt of the receipt of the storage request and an indication of the user that originated the request. In step 310, the content management apparatus generates a searchable index for the content, such as by associating each portion of extracted searchable information, context information, and system tag information as well as the original content and attachment file with a unique identifier.

In step 312, the content management apparatus 12 generates preservation objects including ODF format and PDF/A format files for the attached resume and text files including only the text for both the electronic mail and the attachment. Additionally, in step 312, the content management apparatus 12 generates a digital signature for each of the preservation objects and signs the preservation objects with a respective digital signature. In step 314, the content management apparatus 12 stores the electronic mail, attachment, context information, searchable index, preservation objects, digital signatures and system tag information in the memory 26 associated with the unique index generated in step 310.

In this example, the content management apparatus 12 proceeds to receive another storage request in step 302, although the content management apparatus 12 could proceed to step 316 instead of or in parallel to proceeding to step 302, as described and illustrated later. In this example, the content management apparatus 12 receives another storage request in step 302 from one of the hiring manager users of one of the client computing devices 14(1)-14(n). The storage request includes content including a scanned paper I-9 form document. The storage request also includes context information including user tag information specifying the HR category and onboarding records subcategory, a description indicating the content includes an I-9 form and an indication of the prospective employee's name.

In step 304, the content management apparatus 12 identifies a type of content for the received content as a scanned document such as based on a file extension or metadata associated with the document. In step 306, the content management apparatus 12 extracts searchable information from the content. In this example, the content management apparatus 12 applies an OCR technique to identify textual content included therein in order to extract searchable information from the scanned document.

In step 308, the content management apparatus 12 generates system tags including the time and date of receipt of the receipt of the storage request and an indication of the user that originated the request. In step 310, the content management apparatus 12 generates a searchable index for the content, such as by associating each portion of extracted searchable information, context information, and system tag information as well as the original content with a unique identifier.

In step 312, the content management apparatus 12 generates preservation objects including a PDF/A format file and a text file including only the text for the I-9 form as extracted through the OCR process. Additionally, in step 312, the content management apparatus 12 generates a digital signature for each of the preservation objects and signs the preservation objects with a respective digital signature. In step 314, the content management apparatus 12 stores the electronic mail, attachment, context information, searchable index, preservation objects, digital signatures and system tag information on one or more of the server computing devices 16(1)-16(n) as associated with the unique index generated in step 310.

In this example, the content management apparatus 12 then proceeds to step 316 and receives a search request including search parameters from the chief human resources officer using the user interface 800. In this example, the U.S.

government has requested to conduct an audit of the organization to confirm compliance with regulatory requirements. Accordingly, the search parameters of the search request include keyword "I-9" in the description user tag.

In step 318, the content management apparatus 12 identifies content stored on the server computing devices 16(1)-16(n) and satisfying the search parameters using the searchable index. In this example, the content management apparatus 12 will identify at least the I-9 form previously stored as described and illustrated earlier. In step 320, the content management apparatus 12 retrieves category access rights and permissions associated with the chief human resources officer as obtained in step 300 and stored in the memory 26.

In step 322, the content management apparatus 12 determines that the chief human resources officer is authorized to view/download content. The content management apparatus 12 provides, in step 324, the content identified in step 318 to one of the client computing devices 14(1)-14(n) associated with the chief human resources officer, such as through the user interface 800. Accordingly, the chief information officer can obtain all the I-9 forms associated with employees in satisfaction of the audit.

When the chief human resources officer views or downloads each of the I-9 forms provided in step 324, the content management apparatus 12 records the action taken by the chief human resources officer. Accordingly, an audit report subsequently generated can include an indication of the action thereby providing increased integrity of the content.

In another example, the chief human resources officer may wish to view all of the records of a specific employee and can do so by searching for all records tagged with the employee's name. In this example, the content management apparatus 12 will provide a resume and an I-9 form associated with the employee even though one was a scanned document and the other an attachment to an electronic mail. Other permutations of search parameters are also possible. The effectiveness of the search is improved through the use of the customized tags and ability of the content management apparatus 12 to ingest content of heterogeneous type, among other features of this technology described herein.

Accordingly, with this technology, content can be ingested, secured, retrieved, and managed for the full information lifecycle. In particular, heterogeneous content is ingested and searchable information is extracted. A search index is generated based on the extracted information as well as metadata and other context information, including information associated with customizable user tags. Using the search index, advanced search capabilities are provided and preserved content is more easily located.

Advantageously, with this technology, access to content by users is managed based on permissions and category associations and can be audited, thereby reducing the need for administrator intervention while maintaining the integrity of the content. Additionally, this technology provides retention management capabilities allowing administrator notification or automatic purging of content based on retention time periods set by users, thereby reducing unnecessary storage overhead.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating preservation and retrieval of heterogeneous content, comprising:

establishing, with a content management apparatus, one or more user tags on behalf of an administrator having authenticated administrator login credentials;

receiving, with the content management apparatus, a storage request from one of a plurality of users different from the administrator and having user login credentials different than the administrator login credentials, wherein the storage request includes content and context information associated with the received content and the received context information comprises at least metadata, a first current date, and information for association with one or more of the user tags;

identifying, with the content management apparatus, one of a plurality of types of content for the received content as a whole;

extracting, with the content management apparatus, searchable information from the received content using one of a plurality of different types of extraction techniques based on the identified one of the plurality of types of content as a whole;

generating, with the content management apparatus, a searchable index for the received content based on at least the extracted searchable information and the context information associated with the received content;

storing, with the content management apparatus, the received content in a manner which is retrievable based on one or more associations in the generated searchable index;

periodically determining, with the content management apparatus, whether a second current date is equivalent to or after a retention date for the content, wherein the retention date is determined based on the first current date and a retention period established on behalf of the one of the plurality of users or determined based on an association of the received content with a category having a default retention period established by the administrator; and providing, with the content management apparatus, a notification to one or more of the administrator or the one of the plurality of users, when the determination indicates that the second current date is equivalent to or after the retention date.

2. The method as set forth in claim 1, further comprising:
generating, with the content management apparatus, from the received content, one or more preservation objects comprising an archival editable format file, an archival viewable format file or a text file including text included in the content;

signing, with the content management apparatus, each of the received content and the one or more preservation objects with a respective digital signature; and storing, with the content management apparatus, the one or more preservation objects and the digital signatures.

3. The method as set forth in claim 1, wherein:
the identified one of the plurality of types of content is a bitmap, image, graphic, or portable data format (PDF) and the extracting further comprises performing an optical character recognition technique on the received content to extract text included therein;

the identified one of the plurality of types of content is text and the extracting further comprises parsing the received content to extract text included therein; and the identified one of the plurality of types of content is an electronic mail and the extracting further comprises retrieving an attachment to the electronic mail and extracting searchable information from both the electronic mail and the attachment.

4. The method as set forth in claim 1, further comprising:

sending, with the content management apparatus, a content management agent to a client computing device, the content management agent comprising machine executable code which, when executed by a processor of the client computing device, causes the processor to perform steps comprising:

facilitating designation by a user of a folder in local or network storage accessible by the user as a watch folder associated with an established set of information for the plurality of user tags; and generating the storage request in response to the user storing the content in the watch folder.

5. The method as set forth in claim 1, further comprising generating, with the content management apparatus, information for one or more system tags, wherein the processing further comprises processing the information for the one or more system tags and the storing further comprises storing the information for the one or more system tags.

6. A non-transitory computer readable medium having stored thereon instructions for facilitating preservation and retrieval of heterogeneous content comprising machine executable code which when executed by a processor, causes the processor to perform steps comprising:

establishing one or more user tags on behalf of an administrator having authenticated administrator login credentials;

receiving a storage request from one of a plurality of users different from the administrator and having user login credentials different than the administrator login credentials, wherein the storage request includes content and context information associated with the received content and the received context information comprises at least metadata, a first current date, and information for association with one or more of the user tags;

identifying one of a plurality of types of content for the received content as a whole;

extracting searchable information from the received content using one of a plurality of different types of extraction techniques based on the identified one of the plurality of types of content as a whole;

generating a searchable index for the received content based on at least the extracted searchable information and the context information associated with the received content;

storing the received content in a manner which is retrievable based on one or more associations in the generated searchable index;

periodically determining whether a second current date is equivalent to or after a retention date for the content, wherein the retention date is determined based on the first current date and a retention period established on behalf of the one of the plurality of users or determined based on an association of the received content with a category having a default retention period established by the administrator; and providing a notification to one or more of the administrator or the one of the plurality of users, when the determination indicates that the second current date is equivalent to or after the retention date.

7. The medium as set forth in claim 6, further having stored thereon instructions comprising machine executable code which when executed by the processor causes the processor to perform steps further comprising:

generating from the received content, one or more preservation objects comprising an archival editable format file, an archival viewable format file or a text file including text included in the content;

signing each of the received content and the one or more preservation objects with a respective digital signature; and storing the one or more preservation objects and the digital signatures.

8. The medium as set forth in claim 6, wherein:

the identified one of the plurality of types of content is a bitmap, image, graphic, or portable data format (PDF) and the extracting further comprises performing an optical character recognition technique on the received content to extract text included therein;

the identified one of the plurality of types of content is text and the extracting further comprises parsing the received content to extract text included therein; and the identified one of the plurality of types of content is an electronic mail and the extracting further comprises retrieving an attachment to the electronic mail and extracting searchable information from both the electronic mail and the attachment.

9. The medium as set forth in claim 6, further having stored thereon instructions comprising machine executable code which when executed by the processor causes the processor to perform steps further comprising:

sending a content management agent to a client computing device, the content management agent comprising machine executable code which, when executed by a processor of the client computing device, causes the processor to perform steps comprising:

facilitating designation by a user of a folder in local or network storage accessible by the user as a watch folder associated with an established set of information for the plurality of user tags; and generating the storage request in response to the user storing the content in the watch folder.

10. The medium as set forth in claim 6, further having stored thereon instructions comprising machine executable code which when executed by the processor causes the processor to perform steps further comprising generating information for one or more system tags, wherein the processing further comprises processing the information for the one or more system tags and the storing further comprises storing the information for the one or more system tags.

11. A content management apparatus, comprising:

a processor coupled to a memory and configured to be capable of executing programmed instructions comprising and stored in the memory to:

establish one or more user tags on behalf of an administrator having authenticated administrator login credentials;

receive a storage request from one of a plurality of users different from the administrator and having user login credentials different than the administrator login credentials, wherein the storage request includes content and context information associated with the received content and the received context information comprises at least metadata, a first current date, and information for association with one or more of the user tags;
identify one of a plurality of types of content for the received content as a whole;
extract searchable information from the received content using one of a plurality of different types of extraction techniques based on the identified one of the plurality of types of content as a whole;
generate a searchable index for the received content based on at least the extracted searchable information and the context information associated with the received content;
store the received content in a manner which is retrievable based on one or more associations in the generated searchable index;
periodically determine whether a second current date is equivalent to or after a retention date for the content, wherein the retention date is determined based on the first current date and a retention period established on behalf of the one of the plurality of users or determined based on an association of the received content with a category having a default retention period established by the administrator; and
provide a notification to one or more of the administrator or the one of the plurality of users, when the determination indicates that the second current date is equivalent to or after the retention date.

12. The apparatus as set forth in claim 11, wherein the processor is further configured to execute programmed instructions comprising and stored in the memory to:
generate from the received content, one or more preservation objects comprising an archival editable format file, an archival viewable format file or a text file including text included in the content;
sign each of the received content and the one or more preservation objects with a respective digital signature; and
store the one or more preservation objects and the digital signatures.

13. The apparatus as set forth in claim 11, wherein:
the identified one of the plurality of types of content is a bitmap, image, graphic, or portable data format (PDF) and the extracting further comprises performing an optical character recognition technique on the received content to extract text included therein;
the identified one of the plurality of types of content is text and the extracting further comprises parsing the received content to extract text included therein; and
the identified one of the plurality of types of content is an electronic mail and the extracting further comprises retrieving an attachment to the electronic mail and extracting searchable information from both the electronic mail and the attachment.

14. The apparatus as set forth in claim 11, wherein the processor is further configured to execute programmed instructions comprising and stored in the memory to:
send a content management agent to a client computing device, the content management agent comprising machine executable code which, when executed by a processor of the client computing device, causes the processor to perform steps comprising:
facilitate designation by a user of a folder in local or network storage accessible by the user as a watch folder associated with an established set of information for the plurality of user tags; and
generate the storage request in response to the user storing the content in the watch folder.

15. The apparatus as set forth in claim 11, wherein the processor is further configured to execute programmed instructions comprising and stored in the memory to generate information for one or more system tags, wherein the processing further comprises processing the information for the one or more system tags and the storing further comprises storing the information for the one or more system tags.

* * * * *